Aug. 4, 1942.　　　　　R. T. CLOUD　　　　　2,291,692
MAGNETIC LOGGING
Filed June 2, 1938　　　　　2 Sheets—Sheet 1
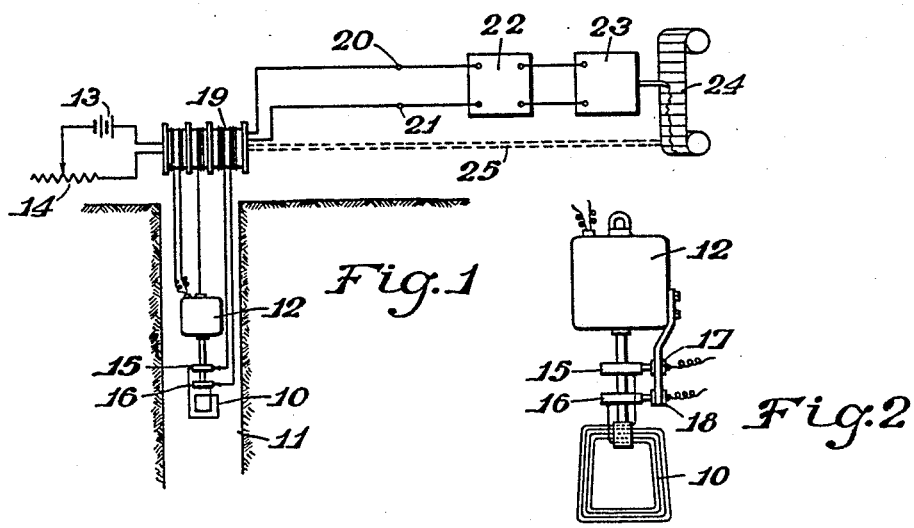
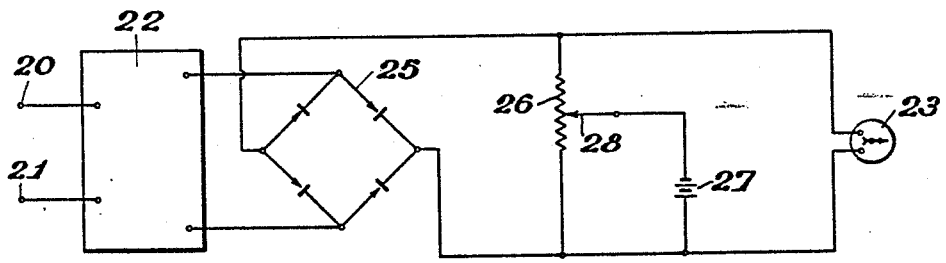
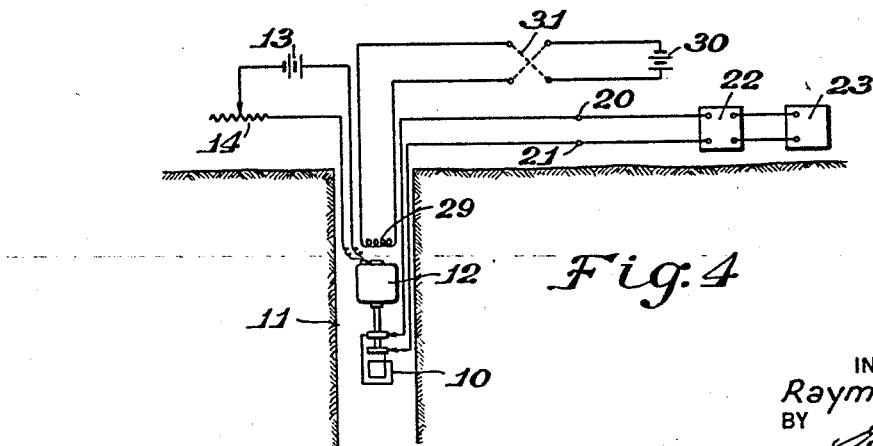
INVENTOR
Raymond T. Cloud
BY
Geo. L. Parkhurst
ATTORNEY Aug. 4, 1942.  R. T. CLOUD  2,291,692
MAGNETIC LOGGING
Filed June 2, 1938  2 Sheets-Sheet 2

INVENTOR
Raymond T. Cloud
BY
ATTORNEY

Patented Aug. 4, 1942

2,291,692

UNITED STATES PATENT OFFICE 2,291,692

MAGNETIC LOGGING

Raymond T. Cloud, Tulsa, Okla., assignor to Stanolind Oil and Gas Company, Tulsa, Okla., a corporation of Delaware Application June 2, 1938, Serial No. 211,366

4 Claims. (Cl. 175—182)

This invention relates to a method of logging wells which involves the measurement of the intensity of the magnetic flux in geological beds traversed by bore holes. The intensity thus measured can be that due to the magnetic poles of the earth or an additional magnetic field can be artificially applied as will hereinafter appear. My invention also relates to apparatus for this purpose.

Various methods for the logging of wells are known and used. These various logging methods involve the measurement of properties, most commonly electrical properties, of the various geological beds traversed by bore holes. These measurements can be correlated for various bore holes in a given area and thus indications can be obtained as to contours of the sub-surface geological formations.

An object of my invention is to provide a new well logging procedure and apparatus which measure properties of the sub-surface formations not heretofore used in previous logging methods. More specifically, an object of my invention is to provide means and methods for well logging by the measurement of magnetic flux at various points within one or more bore holes. Other and more detailed objects, advantages and uses of my invention will become apparent as the description thereof proceeds.

The new well logging method which I have invented contemplates the study of strata traversed by bore holes by measuring anomalies in the magnetic flux due to variations in magnetic susceptibility. Magnetic susceptibility K is defined as the ratio of the intensity of magnetization I at any point to the magnetic field H to which it is due. In other words:

$$K = I/H$$

Since the magnetic flux B in a material is given by the following formula $$B = H + 4\pi I$$

it follows that $$B = H(1 + 4\pi K)$$

In other words, when the magnetic field H is constant, the magnetic flux is a function of the magnetic susceptibility and of no other variable.

Diamagnetic materials are characterized by negative magnetic susceptibilities while paramagnetic substances are characterized by positive magnetic susceptibilities.

The magnetic susceptibilities of various minerals and rocks vary greatly, for instance, for substances such as bismuth, lead and sulfur K has a negative value; substances such as barite, calcite and quartz have susceptibilities substantially zero; while at the other end of the scale magnetite has an extremely large positive magnetic susceptibility.

As the sedimentary beds are made up of various quantities of decomposed minerals they exhibit various values of susceptibility depending upon the physical compositions of such sediments. Thus a measurement of the magnetic susceptibilities of the materials surrounding a bore hole at various depths or, in other words, the measurement of the magnetic flux traversing a bore hole at various depths (assuming a constant magnetic field) will indicate the nature of the beds which traverse the bore hole and thus excellent correlatable logs can be obtained. Moreover, in many cases the magnetic anomalies between various beds are different and more striking than electrical and other anomalies and thus the records obtained have advantages over previous known logs.

Moreover, such logging operations not only serve to permit correlation between various bore holes but also serve as a direct means of prospecting for ores and other economic products of considerable value since various economic products have characteristic magnetic susceptibilities or are known to be associated with certain specific types of sediments having characteristic magnetic susceptibilities.

The horizontal intensity of the earth's field varies from 0.15 to 0.29 gauss in this country, depending upon the geographical location at which the measurement is made. These values also vary through periodic, daily, annular and secular periods of time. Also, sudden irregular changes sometimes take place at intervals in the magnetic fields of the earth. Under the usual conditions of well logging, however, the intensity can be considered as constant or check stations can be set up in the vicinity so that corrections can be made for such variations.

My preferred method of measuring the flux density consists of a coil rotating in the plane of the magnetic field. This coil is provided with a pair of commutating rings which enable the measurement of the electromotive force generated by the conductors cutting the lines of force in the field of operation. The measured electromotive force is proportional to the flux density at the point where the rotating coil is located and from this measured electromotive force, flux density and magnetic susceptibility can be calculated.

My invention will now be described with particular reference to the accompanying drawings which form a part of this specification and which should be read in conjunction therewith. In the drawings:

Figure 1 shows diagrammatically one specific form of apparatus in accordance with my invention;

Figure 2 shows a detail of a portion of the apparatus of Figure 1;

Figure 3 shows one modification of amplifying and recording apparatus for practicing my invention;

Figure 4 is a diagrammatic showing similar to Figure 1 but illustrating an alternative form of my invention;

Figure 5:
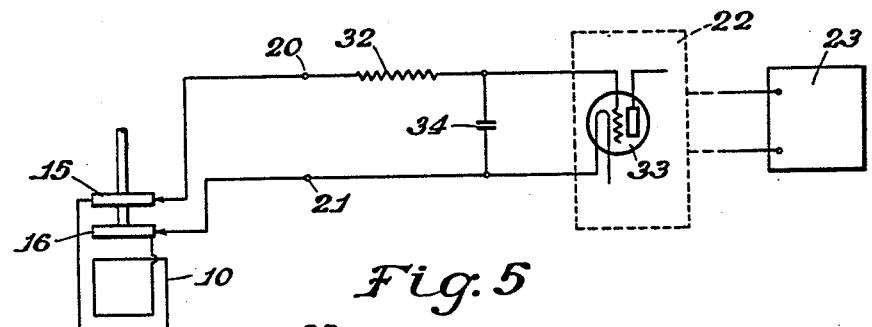
Figure 5 is a detail showing a modification of a portion of the apparatus of Figure 4.

Turning now more particularly to Figure 1, a coil 10 is rotated within bore hole 11 by a motor 12 which is driven by battery 13 and controlled by means of variable resistance 14. Coil 10, as shown in more detail in Figure 2, has its opposite ends connected to commutating rings 15 and 16 on which bear brushes 17 and 18. These brushes are connected to a recording circuit by means of the wiring shown in Figure 1. The motor and coil are raised and lowered by hoist 19 and the electrical conductors leading from slip rings 15 and 16 likewise pass over hoist 19 as do the conductors leading from battery 13 and resistance 14 to motor 12.

From hoist 19 the recording circuit conductors pass through commutating rings (not shown) to terminals 20 and 21. The output potential from coil 10, being alternating in character, is amplified by amplifier 22 and recorded by recorder 23 which makes a record on chart 24. This chart is synchronized with hoist 19, as indicated by dashed lines 25, and thus the record made is a plot of depth against a function of the magnetic susceptibility.

The coil should be rotated at a sufficiently high rate of speed to provide a frequency high enough to permit the use of the usual type of amplifier for amplifying such currents. A high speed also minimizes outside disturbances which might result in erroneous readings. Thus, for instance, speeds of rotation from about 500 R. P. M. to about 5,000 R. P. M., for instance about 1,000 R. P. M., are suitable.

Assuming a constant rate of rotation for the exploring coil 10, the voltage delivered at the terminals is proportional to the flux density.

The voltage generated by a coil rotating in a magnetic field is $$E = 2\pi n NAB \cdot 10^{-8}$$

where $n$ = number of revolutions per second
$N$ = number of turns in the coil
$A$ = area of field enclosed by the coil in square centimeters, and
$B$ = number of lines of force per square centimeter.

Substituting the value of $B$ defined by the third formula given above in the last formula given above and solving for $K$ the susceptibility, we find that:

$$K = \frac{E}{8\pi^2 n NAH \cdot 10^{-8}} - \frac{1}{4\pi}$$

We thus have a means of measuring the magnetic susceptibility of the various strata traversed by a bore hole whereby correlations between wells can be made by comparison and the nature of the beds can be deduced from the values of magnetic susceptibility.

Some idea of the voltages obtained by this method can be obtained by considering the case of a coil having dimensions that enclose an area of 100 square centimeters, and revolving at 3600 revolutions per minute in an earth field of 0.2 gauss—the susceptibility of the strata being assumed as zero. These values inserted in the next to last formula give a potential of .0754 volt.

This potential is ample for the operation of a galvanometer directly without amplification. However, in order to detect small changes in susceptance it is better to amplify the output of the coil, and provide for rectification and balancing out by means of the arrangement shown in Figure 3. Here the output from the rotating coil is connected to terminals 20 and 21 leading to amplifier 22. The output current from the amplifier is rectified by means of rectifier 25 and is applied to the two end terminals of the potentiometer resistance 26 as well as to the terminals of the galvanometer 23 which corresponds to recorder 23 of Figure 1. A portion of the voltage is bucked out by the standard cells 27 and sliding contact 28.

The method of operation is as follows: The rotating coil 10 is operated at the surface of the ground and then slider 28 is adjusted until there is no deflection of galvanometer 23. The rotating coil is then lowered into the well and the galvanometer records the anomalies due to the magnetic susceptance of the layers traversed by the bore hole. By suitable calibration of the amplifier and galvanometer, using a galvanometer of the type commonly used with such recording apparatus and a normal amount of amplification, it is possible to measure susceptances of the order of $5 \times 10^{-6}$, assuming that there are no variations in speed of rotation or of the earth's magnetic field. However, the measurements of this degree of accuracy are not usually required.

It is not necessary to depend on the earth's magnetic field as a source of magnetomotive force, as a field can be applied by a coil placed above or below the rotating coil as shown in Figure 4. Magnetization coil 29 should be of sufficient size and magnetizing force to provide a field much greater than that due to the earth's field. This coil is raised and lowered with motor 12, coil 10 and associated equipment but the hoisting device is omitted from the drawing for the sake of clarity. In order to cancel the effect of the earth's field the D. C. exciting current supplied to coil 29 by battery 30 can be reversed by means of reversing switch 31 or by a commutating device at intervals which are short compared with the resolution of the recording apparatus which should be arranged to record the average readings obtained in the above manner.

The method of averaging the readings can suitably be that shown by the circuit of Figure 5 where a resistance 32 is placed in series with the input to the first tube 33 of amplifier 22 and a condenser 34 in shunt with the input to the tube. By proper selection of the values of resistance 32 and condenser 34 the voltage applied to tube 33 is averaged. The actual values of the resistance and condenser to be used depend upon the other constants of the circuit, but the resistance 32 should be of the order of hundreds of thousands of ohms and the condenser from about 0.1 to about 1 microfarad. For simplicity the remainder of amplifier 22 is not shown. As many stages can be used as are desired.

Figure 6:
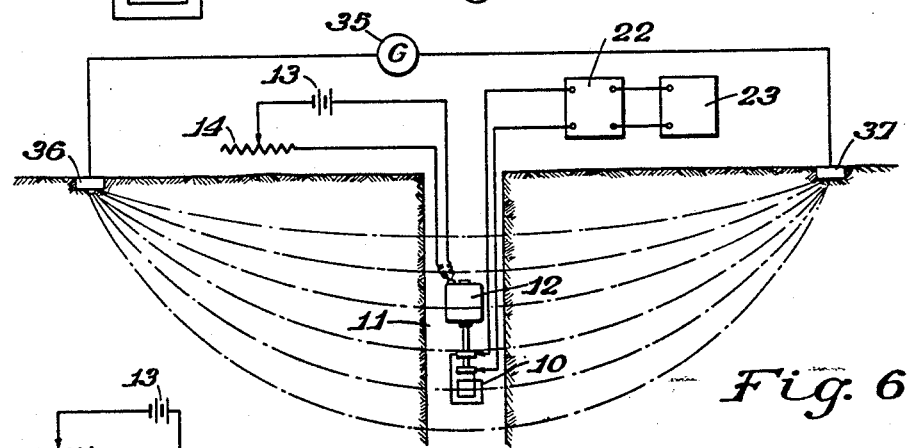
Figures 6 and 7 show additional modifications of my invention.

Instead of using an exciting coil as in Figure 4, an artificial magnetic field can be created by applying a current to the earth by means of electrodes buried on either side of the bore hole being surveyed. This is illustrated by Figure 6. In this figure, as in Figures 4 and 7, the hoisting apparatus is not indicated.

As shown in Figure 6 current is applied to the earth by means of a generator 35 and electrodes 36 and 37 and the paths of the curent through the ground are as indicated by the dashed lines. Only that portion of the current below the coil 10 is effective in creating a magnetic field at the point where the exploring coil is located. Therefore, assuming a homogeneous magnetic medium, the field falls off with depth. The value of the current below a given point can be computed by any of the well-known methods known to the art of electrical prospecting, such as, the formula given by Peters and Borden in the "Bulletin of University of Wisconsin Engineering Experiment Station, Series 71," page 23, which is:

$$Id = I\left(1 - \frac{2}{\pi} \tan^{-1}\frac{d}{a}\right)$$

where
$Id$ = total current crossing below plane of depth $d$
$I$ = total current applied at surface of ground, and
$a$ = one-half the distance between electrodes Knowing the amount of current circulating below the coil, a curve can be plotted showing the magnetic density variation down the well for a homogeneous medium. Correlation can then be made by noting the deviation and irregularities occurring in an actual survey. The methods of eliminating earth magnetic forces used in the exciting coil method are also applicable in this case.

Various methods can, of course, be used for achieving constant speed of rotation of coil 10, for instance any of the well-known frequency indicating devices can be used. Furthermore, it is not essential that the speed of rotation be constant so long as it is known so that a correction can be made.

Figure 7:
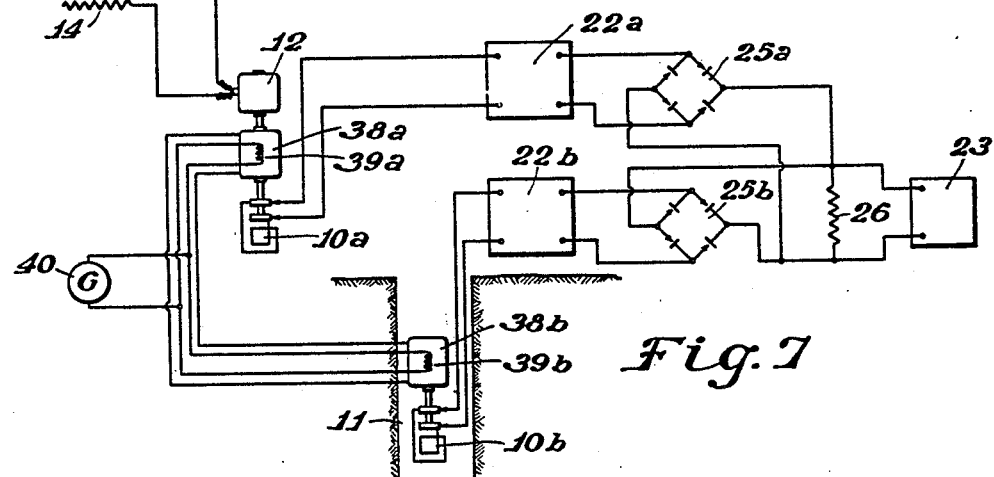
Figure 8:
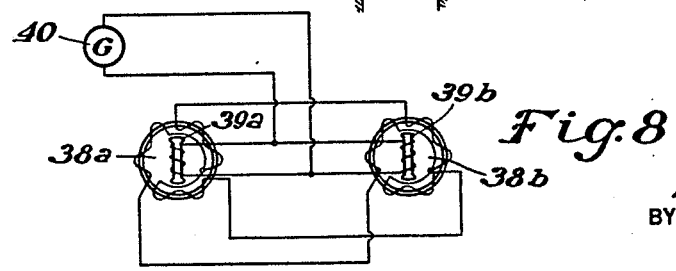
Figure 8 is a detail showing the hook-up of the Selsyn motors shown in Figure 7.

One of the best methods for achieving absolutely accurate control of the rate of rotation is illustrated in Figures 7 and 8 and this method is suitable where extremely accurate measurements are desired or where the intensity of the earth's field is likely to vary during the process of the survey, since compensation for this variation is provided. In the system of Figures 7 and 8 duplicate rotating coils 10a and 10b are used, one at the surface of the earth and the other in bore hole 11. Each coil is rotated by a Selsyn motor 38a and 38b so that the speeds of rotation of the coils are identical.

The arrangement of the Selsyn motor circuit is as shown in Figure 8. Rotors 39a and 39b are connected in series and excited by an A. C. source 40. The stators of the two circuits are likewise connected in series in the usual manner. Motor 12 rotates rotor 39a and rotor 39b necessarily rotates at exactly the same speed.

Coils 10a and 10b are connected to amplifiers 22a and 22b which in turn are connected to rectifiers 25a and 25b which are connected in opposition so that when the two coils are operating in the same field no output is recorded by recorder 23. The galvanometer, therefore, records at all times the differential due to the susceptibility of the bed that is being traversed. This method does not provide an absolute measurement of the susceptance but measures the anomalies thereof. However, in cases where such values of susceptance are desired the total voltage output of one of the coils can be recorded independently and the susceptance calculated.

While I have described my invention in connection with certain specific embodiments thereof, it is to be understood that these are by way of illustration and not by way of limitation and my invention is not to be restricted thereto but only to the scope of the appended claims.

I claim:

1. Apparatus for exploring the geological formations traversed by a bore hole comprising a magnetization coil adapted to be lowered into said bore hole and, when energized, to set up magnetic lines of force in said bore hole and surrounding strata, means for energizing said magnetization coil including means for passing a direct current through said magnetization coil and means for reversing said current, an exploration coil substantially vertically spaced from said magnetization coil, means for rotating one of said coils to cause said exploration coil to cut said magnetic lines of force, means for measuring a function of the electromotive force generated in said exploration coil, and means for changing the level of said coils within said bore hole while maintaining their spacing.

2. Apparatus for exploring the geological formations traversed by a bore hole including a magnetization coil adapted to be lowered into said bore hole and when energized to generate magnetic lines of force in said bore hole and the surrounding strata, means for energizing said magnetization coil whereby the magnetic field generated by said magnetization coil considerably exceeds the natural magnetic field of the earth in said surrounding strata, an exploration coil spaced a fixed distance from said magnetization coil and adapted to be lowered into said bore hole, and means for rotating one of said coils to cause said exploration coil to cut certain of said magnetic lines of force, and means for measuring a function of the electromotive force thus generated in said exploration coil.

3. Apparatus for exploring the geological formations traversed by a bore hole comprising a magnetization coil adapted to be lowered into said bore hole and, when energized, to set up magnetic lines of force in said bore hole and the surrounding strata, means for energizing said magnetization coil including means for passing a direct current through said magnetization coil and means for reversing said current, an exploration coil substantially vertically spaced from said magnetization coil, means for rotating said exploration coil to cut said magnetic lines of force, means for measuring a function of the electromotive force generated in said exploration coil, and means for changing the level of said coils within said bore hole while maintaining the spacing.

4. Apparatus for exploring the geological formations traversed by a bore hole comprising a magnetization coil adapted to be lowered into said bore hole and, when energized, to set up magnetic lines of force in said bore hole and the surrounding strata, means for energizing said magnetization coil sufficient to provide a magnetic field in the vicinity of said exploration coil much stronger than the natural magnetic field of the earth, an exploration coil substantially vertically spaced from said magnetization coil, means for rotating said exploration coil to cut said magnetic lines of force, means for measuring a function of the electromotive force generated in said exploration coil, and means for changing the level of said coils within said bore hole while maintaining their spacing.

RAYMOND T. CLOUD.